United States Patent
Zhao (10) Patent No.: US 12,423,326 B2
(45) Date of Patent: Sep. 23, 2025

(54) METHOD OF ASSOCIATION INFERENCE FOR TIME SERIES DATA BASED ON LOCAL VARIATION FEATURES

(71) Applicant: Northwest Institute of Eco-Environment and Resources, Chinese Academy of Sciences, Lanzhou (CN)

(72) Inventor: Guohui Zhao, Lanzhou (CN)

(73) Assignee: Northwest Institute of Eco-Environment and Resources, Chinese Academy of Sciences, Lanzhou (CN)

( * ) Notice: Subject to any disclaimer, the term of this patent is extended or adjusted under 35 U.S.C. 154(b) by 150 days.

(21) Appl. No.: 18/535,945

(22) Filed: Dec. 11, 2023

(65) Prior Publication Data

US 2024/0273117 A1    Aug. 15, 2024

(30) Foreign Application Priority Data

Feb. 13, 2023  (CN) .......................... 202310108058.7

(51) Int. Cl.
G06F 16/28    (2019.01)

(52) U.S. Cl.
CPC ................... *G06F 16/284* (2019.01)

(58) Field of Classification Search
None
See application file for complete search history.

(56) References Cited

U.S. PATENT DOCUMENTS

2022/0222547 A1    7/2022  Jagota

FOREIGN PATENT DOCUMENTS

| CN | 105023044 A | 11/2015 |
| CN | 111221983 A | 6/2020 |
| CN | 115358628 A | 11/2022 |
| CN | 115526469 A | 12/2022 |
| EP | 4053750 A1 | 9/2022 |
| WO | WO 2019/001168 A1 | 1/2019 |
| WO | WO 2020/224112 A1 | 11/2020 |

OTHER PUBLICATIONS

Chinese Notice of Grant of Invention Patent Rights dated Aug. 28, 2023 in connection with Chinese Application No. 202310108058.7.
Ren et al., Survey on Causality Analysis of Multivariate Time Series. Acta Automatica Sinica. Jan. 2021;47(1):64-78.
Zhao, A brief analysis on the development rules of collapse pillars in Zhangshuanglou Coal Mine. Chemical Management. Technology and Information. Dec. 2019, pp. 133-134. 4 pages.

*Primary Examiner* — Eddy Cheung
(74) *Attorney, Agent, or Firm* — Wolf, Greenfield & Sacks, P.C.

(57) ABSTRACT

A method, an apparatus, a storage medium and an electronic device for analyzing a relationship between data sequences are provided. The electronic device acquires a first data sequence and a second data sequence, obtains correlation indexes of a plurality of segment pairs according to the first data sequence and the second data sequence, selects a target segment pair with the largest correlation index according to the correlation indexes of the plurality of segment pairs, and obtains correlation information between the first data sequence and the second data sequence according to the target segment pair.

9 Claims, 8 Drawing Sheets

METHOD OF ASSOCIATION INFERENCE FOR TIME SERIES DATA BASED ON LOCAL VARIATION FEATURES

CROSS-REFERENCE TO RELATED APPLICATION

The present disclosure claims priority to and the benefit of Chinese Patent Application Serial No. 202310108058.7, filed with the Chinese Patent Office on Feb. 13, 2023, and entitled "Method, apparatus, storage media and electronic device for analyzing relationships between data sequences." The contents of this application are incorporated herein by reference in their entirety.

TECHNICAL FIELD

The present disclosure relates to the field of big data, in particular to a method, an apparatus, a storage media and an electronic device for analyzing relationships between data sequences.

BACKGROUND ART

Time series data is a sequential record of orderly observation of a physical state or phenomenon, which contains the influence of various external factors on its evolution, and shows specific change characteristics. It is the basis of many scientific researches and decision-making in nature, engineering, society, economy, etc.

Since time series is the basis data of data mining, knowledge discovery, scenario prediction and other technologies, and data science has moved from extensive analysis to fine-grained analysis, it requires qualitative and quantitative analysis of the change law and influence degree of a certain characteristic, such as how much the climate changes, what it will bring to the health of certain groups of human beings, and what kind of temperature conditions will increase the yield of different food crops. Therefore, under the current background of big data, with the continuous accumulation and enrichment of time series data, mining and analyzing the characteristics of their changes has become a core technical requirement in data science.

In the traditional sense, most of the correlation inference methods analyze the causal relationship between different factors by building a complex physical process model. However, in natural and social phenomena, local change effects are common, for example, organisms have their own temperature adaptation intervals, viruses have different infection mortality rates for people of different ages, etc., which requires consideration of fine-grained mining analysis of time series data, but traditional correlation inference methods do not achieve the desired results.

SUMMARY

In order to overcome at least one of the shortcomings of the prior art, the present disclosure provides a method and apparatus for analyzing a relationship between data sequences, which can be used for analyzing the lagging correlation relationship between two data sequences. The present disclosure specifically includes the following aspects.

In a first aspect, the present disclosure provides a method for analyzing a relationship between data sequences, which includes:

acquiring a first data sequence and a second data sequence;

obtaining correlation indexes of a plurality of segment pairs according to the first data sequence and the second data sequence, wherein each segment pair includes a first sequence segment of the first data sequence and a second sequence segment of the second data sequence, and the first sequence segment and the second sequence segment are respectively intercepted from different time periods;

selecting, according to the correlation indexes of the plurality of segment pairs, a target segment pair with the largest correlation index therefrom; and obtaining correlation information between the first data sequence and the second data sequence according to the target segment pair.

In a second aspect, the present disclosure provides an apparatus for analyzing a relationship between data sequences, which includes:

a sequence segmentation module, configured for acquiring a first data sequence and a second data sequence, wherein the sequence segmentation module is further configured for obtaining correlation indexes of a plurality of segment pairs according to the first data sequence and the second data sequence, wherein each segment pair includes a first sequence segment of the first data sequence and a second sequence segment of the second data sequence, and the first sequence segment and the second sequence segment are respectively intercepted from different time periods;

a segment screening module, configured for selecting, according to the correlation indexes of the plurality of segment pairs, a target segment pair with the largest correlation index therefrom; and a relationship analysis module, configured for obtaining correlation information between the first data sequence and the second data sequence according to the target segment pair.

In a third aspect, the present disclosure provides a storage medium, which stores a computer program, and the computer program, when executed by a processor, implements the method for analyzing a relationship between data sequences.

In a fourth aspect, the present disclosure provides an electronic device, which includes a processor and a memory, wherein the memory stores a computer program, and the computer program, when executed by the processor, implements the method for analyzing a relationship between data sequences.

Compared with the prior art, the present disclosure has the following beneficial effects:

According to the method, the apparatus, the storage medium and the electronic device for analyzing a relationship between data sequences provided by the present disclosure, the electronic device acquires a first data sequence and a second data sequence; obtains correlation indexes of a plurality of segment pairs according to the first data sequence and the second data sequence, and selects a target segment pair with the largest correlation index according to the correlation indexes of the plurality of segment pairs; and obtains correlation information between the first data sequence and the second data sequence according to the target segment pair. Since each segment pair includes a first sequence segment of the first data sequence and a second sequence segment of the second data sequence, and the first sequence segment and the second sequence segment are respectively intercepted from different time periods, the lagging correlation relationship between the two data sequences can be obtained.

BRIEF DESCRIPTION OF DRAWINGS

In order to illustrate the technical solutions of the embodiments of the present disclosure more clearly, the following drawings that need to be used in the embodiments will be briefly introduced. It is to be understood that the following drawings only show some embodiments of the present disclosure, so they shall not be regarded as limiting the scope. For those ordinarily skilled in the art, other relevant drawings may be obtained according to these drawings without creative efforts.

Reference numerals: 101—sequence segmentation module; 102—segment screening module; 103—relationship analysis module; 201—memory; 202—processor; 203—communication unit; 204—system bus.

DETAILED DESCRIPTION OF EMBODIMENTS

In order to make the objectives, technical solutions and advantages of the embodiments of the present disclosure clearer, the technical solutions in the embodiments of the present disclosure will be clearly and completely described below with reference to the accompanying drawings in the embodiments of the present disclosure. Obviously, the described embodiments are some rather than all of the embodiments of the present disclosure. Generally, the components of the embodiments of the present disclosure described and illustrated in the drawings herein may be arranged and designed in various different configurations.

Therefore, the following detailed description of the embodiments of the present disclosure provided in the drawings is not intended to limit the claimed scope of protection of the present disclosure, but only represents selected embodiments of the present disclosure. Based on the embodiments of the present disclosure, all other embodiment obtained by those ordinarily skilled in the art without making creative efforts shall fall within the scope of protection of the present disclosure.

It should be noted that similar reference numerals and letters indicate similar items in the accompanying drawings, so once a certain item is defined in a drawing, it does not need to be further defined and described in subsequent drawings.

In the description of the present disclosure, it should be noted that the terms "first", "second" and "third", etc. are only intended to distinguish descriptions, and shall not be understood as indicating or implying relative importance. Moreover, the terms "include", "involve", "contain" or any other variation thereof are intended to cover non-exclusive inclusion, so that a process, a method, an article or a device including a series of elements includes not only those elements, but also other elements not explicitly listed or elements inherent to such a process, a method, an article or a device. In the absence of further restrictions, an element defined by the statement "including one" does not exclude the existence of other same elements in the process, method, article or device including the element.

Based on the above statement, it is found that the related method for analyzing the correlation between time series usually uses a correlation index to analyze the linear correlation between time series. Although there are many kinds of correlation indexes, such as Pearson, Spearman and other correlation coefficients, they all analyze the change characteristics of two time series as a whole, ignoring the nonlinear characteristics and interval effects between time series.

For example, the influence of temperature change in spring on vegetation growth in summer has a large time lag. For another example, the influence of the sudden drop in temperature on the outbreak of influenza also has a time lag.

Figure 1:
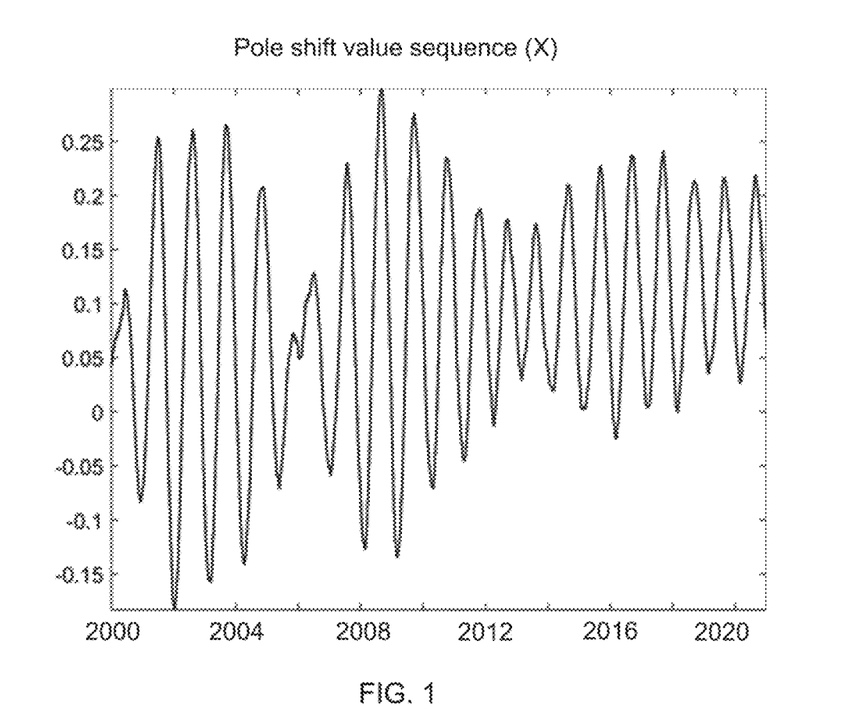
FIG. 1 is a partial pole shift value sequence of the earth in the direction x provided by an embodiment of the present disclosure.
Figure 2:
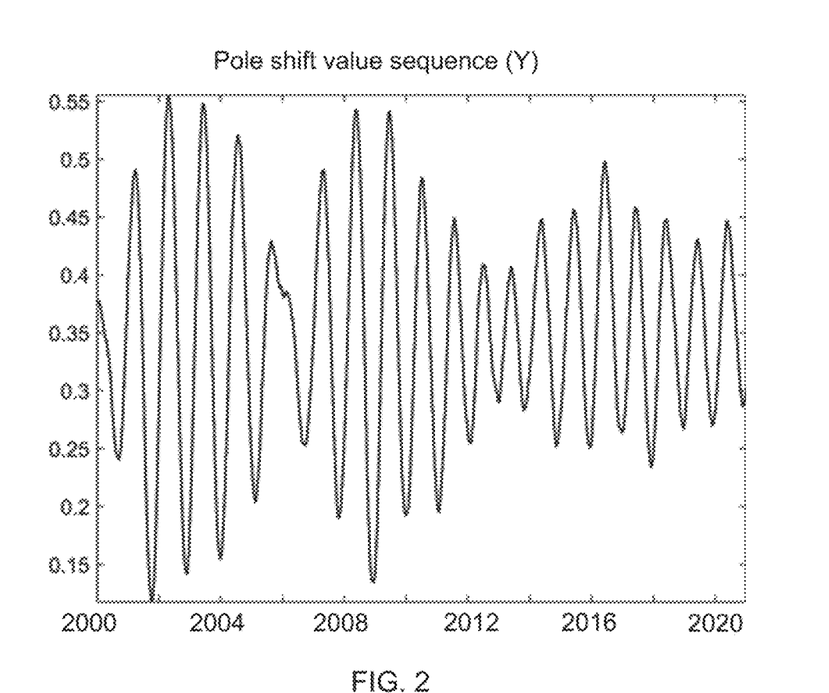
FIG. 2 is a partial pole shift value sequence of the earth in the direction y provided by an embodiment of the present disclosure.
Figure 3:
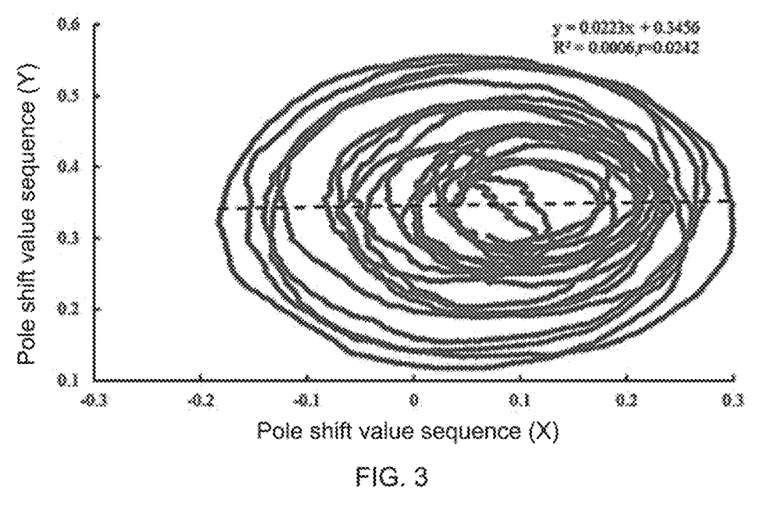
FIG. 3 is a schematic diagram of the sequence relationship analyzed by the conventional method provided by an embodiment of the present disclosure.

For this kind of problem, it is often difficult to find out the timing relationship between the two time series by the conventional method of analyzing the change characteristics of the two time series as a whole. For example, FIGS. 1 and 2 show two data sequences derived from the International Earth Rotation and Reference System, which are represented by X and Y respectively, where X represents the partial pole shift value sequence of the earth in the direction x, and Y represents the partial pole shift value sequence of the earth in the direction y, both use days as sampling resolution. If the two data sequences are analyzed by conventional methods, the analysis result is shown in FIG. 3, but FIG. 3 cannot clearly reflect the correlation characteristics and degree between the two data sequences.

Therefore, in order to understand the interaction characteristics of specific interval changes in time series, it is necessary to establish qualitative and quantitative indexes and a method for correlation inference, so as to describe the acting strength of these change characteristics in value domain and time domain. At the same time, we should also pay attention to the lag phenomenon in the interaction between change characteristics.

It should be noted that all the defects in the above solutions in the prior art are the results obtained by the inventors after practice and careful study. Therefore, the discovery process of the above problems and the solutions to the above problems proposed in the following embodiments of the present disclosure should be regarded as the contributions made by the inventors to the present disclosure in the process of invention and creation, and should not be understood as the technical contents known to those skilled in the art.

The present embodiment provides a method for analyzing a relationship between data sequences, which is used for analyzing the lagging correlation relationship between two data sequences. Herein, an electronic device implementing the method may be, but not limited to, a mobile terminal, a tablet computer, a laptop computer, a desktop computer, and a server, etc.

When the electronic device is a server, the server may be a single server or a server group. The server group may be centralized or distributed (for example, the server may be a distributed system). In some embodiments, the server may be local or remote relative to the user terminal. In some embodiments, the server may be implemented on a cloud platform, for example only, the cloud platform may include a private cloud, a public cloud, a hybrid cloud, a community cloud, a distributed cloud, an inter-cloud, a multi-cloud, etc. In some embodiments, the server may be implemented on an electronic device with one or more components.

Figure 4:
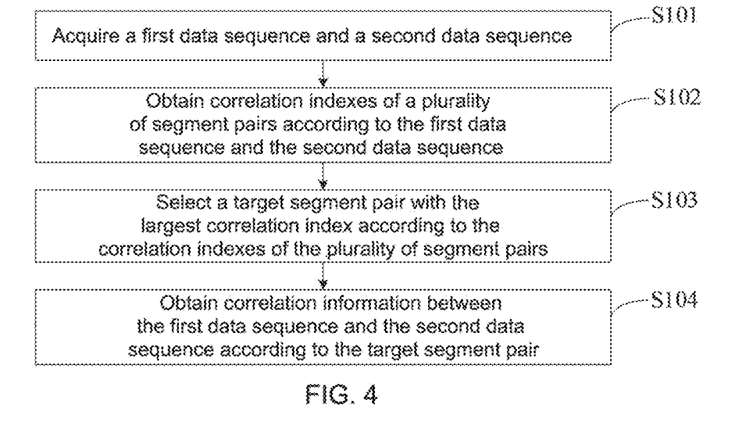
FIG. 4 is a flowchart of the method for analyzing a relationship between data sequences provided by an embodiment of the present disclosure.

Based on the introduction in the above embodiments, each step of the method will be described in detail with reference to FIG. 4. However, it should be understood that the operations of the flowchart may be implemented out of order, and the steps without logical context may be reversed or implemented simultaneously. In addition, those skilled in the art may add one or more other operations to the flowchart or remove one or more operations from the flowchart under the guidance of the contents of the present disclosure. As shown in FIG. 4, the method includes:

S101: acquiring a first data sequence and a second data sequence.

S102: obtaining correlation indexes of a plurality of segment pairs according to the first data sequence and the second data sequence.

Herein, each segment pair includes a first sequence segment of the first data sequence and a second sequence segment of the second data sequence, and the first sequence segment and the second sequence segment are intercepted from different time periods respectively. In addition, the first data sequence and the second data sequence in this embodiment may be data sequences collected in various application scenarios, which is not specifically limited in this embodiment. For example, when the first data sequence is a temperature sequence collected periodically, the second data sequence may be a vegetation growth sequence composed of vegetation growth collected periodically; when the first data sequence is a temperature difference sequence composed of temperature differences collected periodically, the second data sequence may be an influenza sequence composed of numbers of influenza infected persons collected periodically.

It is found that not every sequence value in the first data sequence will have a significant influence on a certain sequence value in the second data sequence. Therefore, in this embodiment, a first sequence threshold value is provided for the first data sequence and a second sequence threshold value is provided for the second data sequence, which are configured for screening the effective data of the two sequences. The relevant specific implementation includes:

S102-1: binarizing the first data sequence into a first equivalent sequence according to a first sequence threshold of the first data sequence.

S102-2: binarizing the second data sequence into a second equivalent sequence according to a second sequence threshold of the second data sequence.

In this embodiment, for each sequence value in the first data sequence, the sequence value is set as a first sequence value if it is greater than the first sequence threshold, and the sequence value is set as a second sequence value if it is less than or equal to the first sequence threshold; and for each sequence value in the second data sequence, the sequence value is set as the first sequence value if it is greater than the second sequence threshold, and the sequence value is set as the second sequence value if it is less than or equal to the second sequence threshold.

Figure 5:
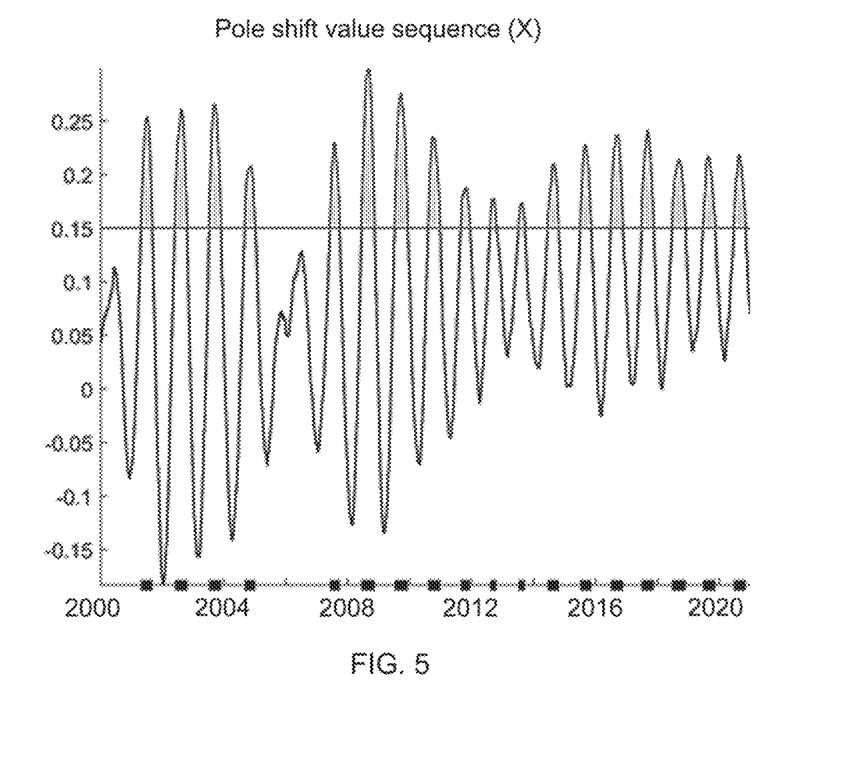
FIG. 5 is a first schematic diagram of a binarization principle provided by an embodiment of the present disclosure.

Exemplarily, the first data sequence shown in FIG. 1 and the second data sequence shown in FIG. 2 are taken as examples. As shown in FIG. 5, assuming that the first sequence threshold of the first data sequence is 0.15, sequence values greater than 0.15 are set to 1, and sequence values less than or equal to 0.15 are set to 0.

Figure 6:
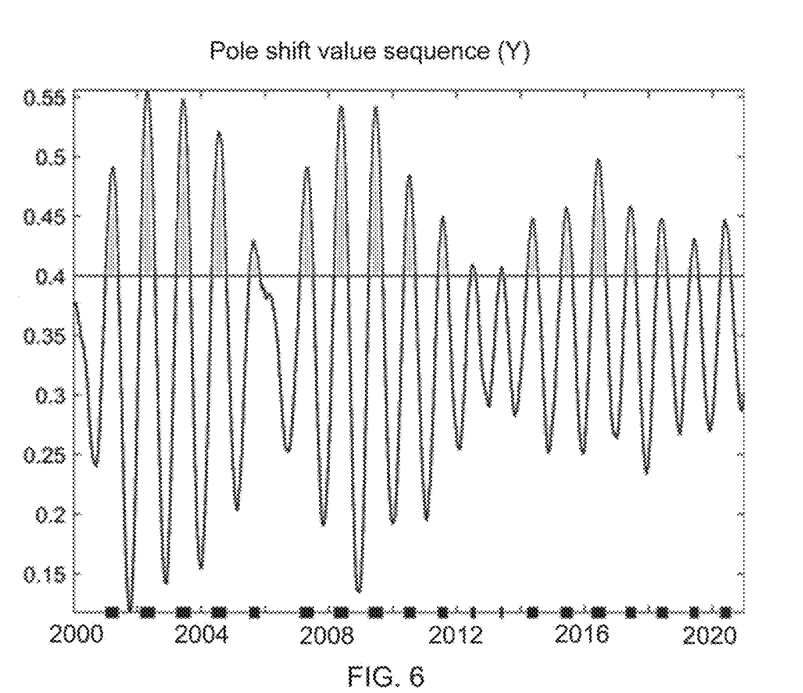
FIG. 6 is a second schematic diagram of the binarization principle provided by the embodiment of the present disclosure.

As shown in FIG. 6, assuming that the second sequence threshold of the second data sequence is 0.4, sequence values greater than 0.4 are set to 1, and sequence values less than or equal to 0.4 are set to 0.

S102-3: incrementing a current lag duration to obtain a target lag duration.

S102-4: intercepting a first equivalent segment from the first equivalent sequence according to the target lag duration.

S102-5: intercepting a second equivalent segment from the second equivalent sequence according to the target lag duration, wherein a time period corresponding to the first equivalent segment is staggered from a time period corresponding to the second equivalent segment by the target lag duration.

S102-6: obtaining a correlation index of a current segment pair according to the first equivalent segment and the second equivalent segment.

Herein, the current segment pair includes the first sequence segment in the first data sequence corresponding to the first equivalent segment and the second sequence segment corresponding to the second equivalent segment in the second data sequence.

S102-7: if the target lag duration does not meet a termination condition, returning to the step of incrementing a current lag duration to obtain a target lag duration to perform, until the target lag duration meets the termination condition, so as to obtain the correlation indexes of the plurality of segment pairs.

Figure 7:
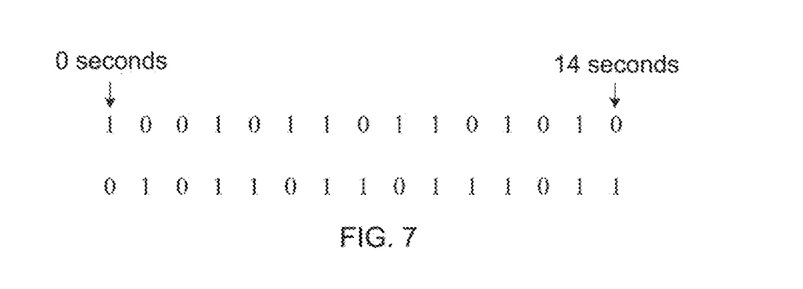
FIG. 7 is a schematic diagram of two equivalent sequences provided by an embodiment of the present disclosure.

Exemplarily, the first equivalent sequence and the second equivalent sequence shown in FIG. 7 have the same observation time period and sampling frequency. The two equivalent sequences in the figure both include 15 sequence values (1 or 0), and the sampling time interval between adjacent sequence values is 1 second, that is, the time period corresponding to these 15 sequence values is 0□14 seconds.

It should be understood that since the sequence values of the first data sequence are in one-to-one correspondence with that of the first equivalent sequence, and the sequence values of the second data sequence are in one-to-one correspondence with that of the second equivalent sequence, the lag duration between the two data sequences is consistent with the lag duration between the two equivalent sequences. Herein, in order to facilitate the introduction of correlation index, the first equivalent sequence and the second equivalent sequence are taken as the research objects to introduce the lag duration.

Figure 8:
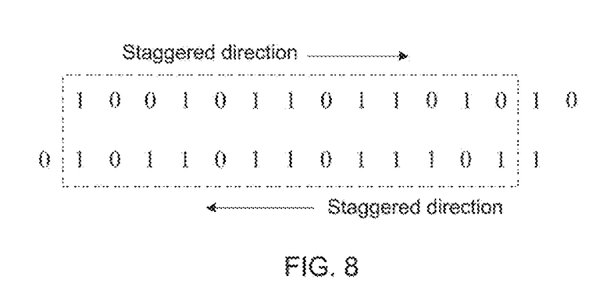
FIG. 8 is a first schematic diagram of a segmentation principle based on lag duration provided by an embodiment of the present disclosure.

With continued reference to FIG. 7, at this time, the lag duration between the two equivalent sequences is 0 seconds, and the lag duration between the two equivalent sequences, which is increased by 1 second based on the current lag duration, will become 1 second, and it is equivalent to staggering the two equivalent sequences in FIG. 7 by 1 second in the direction shown in FIG. 8, and the aligned parts between the two equivalent sequences in FIG. 8 are intercepted separately, so as to obtain the first equivalent segment and the second equivalent segment.

Herein, the time period of the first equivalent segment is at 0□13 seconds, and the time period of the second equivalent segment is at 1□14 seconds. At this time, it means that the first sequence segment at 0□13 seconds in the first data sequence and the second sequence segment at 1□14 seconds in the second data sequence form a segment pair.

Figure 9:
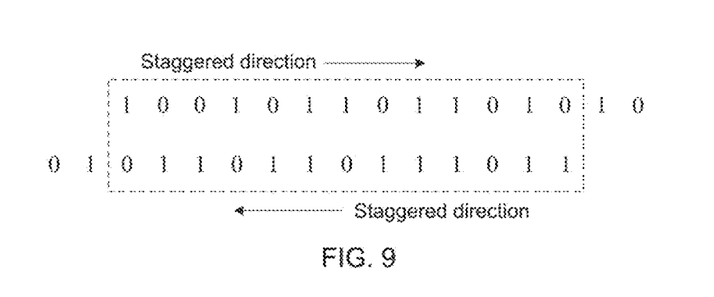
FIG. 9 is a second schematic diagram of the segmentation principle based on lag duration provided by the embodiment of the present disclosure.

Similarly, increased by 1 second based on the current lag duration, the lag duration between the two equivalent sequences will become 2 seconds, which is equivalent to staggering the two equivalent sequences in FIG. 7 by 2 seconds in the direction shown in FIG. 9, and the aligned parts between the two equivalent sequences in FIG. 9 are intercepted separately, so as to obtain the first equivalent segment and the second equivalent segment.

Herein, the time period of the first equivalent segment is at 0□12 seconds, and the time period of the second equivalent segment is at 2□14 seconds. At this time, it means that the first sequence segment at 0□12 seconds in the first data sequence and the second sequence segment at 2□14 seconds in the second data sequence form a segment pair.

Analogously, the first equivalent segment and the second equivalent segment of the plurality of segment pairs can be obtained, and then the correlation index of each segment pair can be obtained according to the first equivalent segment and the second equivalent segment of each segment pair respectively. It is worth noting here that the lag duration between the two equivalent sequences is not limited to positive numbers, but may also be negative numbers, that is, the values of the lag duration between the two equivalent sequences in FIG. 7 include [−14, −13 • • • −3, −2, −1, 0, 1, 2, 3 • • • 13, 14] Herein, when the lag duration is negative, it means that the two equivalent sequences in FIG. 7 are staggered in the opposite direction as shown in FIGS. 8 and 9.

For each segment pair, the correlation index can be calculated by the following expression:

$$CI = \frac{N_{XY}}{N_{XX} + N_{YY} - N_{XY}},$$

where CI represents the correlation index of the current segment pair, $N_{XY}$ represents the number of correlation index pairs between the first equivalent segment and the second equivalent segment, wherein the first sequence values located at same sequence positions of the first equivalent segment and the second equivalent segment constitute a correlation index pair, $N_{XX}$ represents a sequence length of the first equivalent segment, and $N_{YY}$ represents a sequence length of the second equivalent segment.

Figure 10:
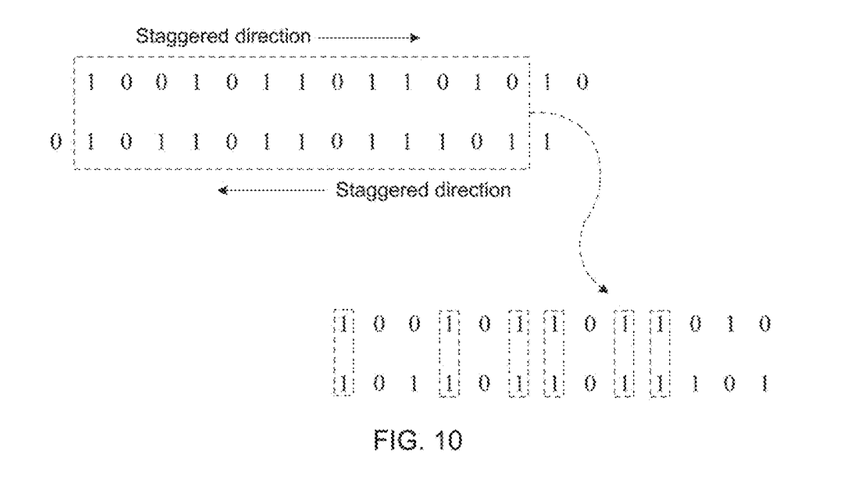
FIG. 10 is a schematic diagram of a correlation index pair provided by an embodiment of the present disclosure.

Continue to take the segment pair shown in FIG. 8 as an example, as shown in FIG. 10, the sequence values "1" at the same sequence positions of the two equivalent segments in the figure are regarded as a set of correlation index pairs. Therefore, there are a total of 6 correlation index pairs in the figure. The sequence length of the first equivalent segment is 14 and the sequence length of the second equivalent segment is 14, so that the result of correlation index CI is:

$$CI = \frac{6}{14 + 14 - 6} \approx 0.33;$$

in this way, according to the method for calculating the correlation index in the above embodiment, the respective correlation indexes of the plurality of segment pairs can be obtained.

In the above implementation, the correlation index of each segment pair is introduced. Based on the correlation index, with continued reference to FIG. 4, the method further includes:

S103: selecting a target segment pair with the largest correlation index therefrom according to the correlation indexes of the plurality of segment pairs.

It should be understood that for the target segment pair with the largest correlation index, it means that there is the most significant correlation relationship between the first sequence segment and the second sequence segment in the target segment pair.

S104: obtaining correlation information between the first data sequence and the second data sequence according to the target segment pair.

Herein, this embodiment provides the following method to analyze the correlation information between the first data sequence and the second data sequence, which specifically includes:

S104-1: segmenting the target segment pair into a plurality of sub-segment pairs.

In this embodiment, the first sequence segment included in the target segment pair is referred to as the first target sequence segment, the second sequence segment is referred to as the second target sequence segment, and the following segmentation method is provided to segment the target segment pair.

S104-1-1: binarizing the first target sequence segment into a first target equivalent segment according to the first sequence threshold of the first data sequence.

S104-1-2: binarizing the second target sequence segment into a second target equivalent segment according to the second sequence threshold of the second data sequence.

Herein, for each sequence value in the first target sequence segment, the sequence value is set as the first sequence value if it is greater than the first sequence threshold, and is set as the second sequence value if it is less than or equal to the first sequence threshold. For Each sequence value in the second target sequence segment, the sequence value is set as the first sequence value if it is greater than the second sequence threshold, and is set as the second sequence value if it is less than or equal to the second sequence threshold.

S104-1-3: comparing the same sequence positions of the first target equivalent segment and the second target equivalent segment, so as to obtain a correlation matrix between the first target equivalent segment and the second target equivalent segment.

Herein, for the same sequence positions of the first target equivalent segment and the second target equivalent segment, the sequence positions are set as a first identifier if the sequence values are all the first sequence values; and the sequence positions are set as a second identifier if the sequence values include the second sequence.

Figure 11:
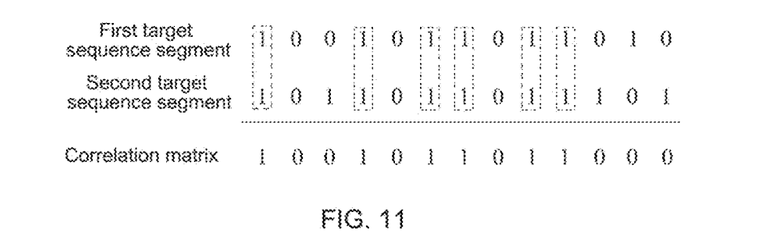
FIG. 11 is a schematic diagram of a correlation matrix provided by an embodiment of the present disclosure.

Exemplarily, assuming that the first target sequence segment and the second target sequence segment are as shown in FIG. 8, and the first identifier is "1" and the second identifier is "0", the same sequence positions of the two target sequence segments in FIG. 8 are compared to obtain the correlation matrix as shown in FIG. 11, and the dimension of the correlation matrix is 1×14

S104-1-4: determining the first identifier arranged in a first place from a current remaining correlation matrix.

S104-1-5: intercepting a matrix segment in a preset time window from the current remaining correlation matrix, based on the sequence positions of the first identifier.

S104-1-6: if the current remaining correlation matrix includes the first identifier, returning to the step of determining the first identifier arranged in a first place from a current remaining correlation matrix to perform, until the current remaining correlation matrix no longer includes the first identifier, so as to obtain a plurality of matrix segments.

S104-1-7: intercepting the plurality of sub-segment pairs from the target segment pair according to the plurality of matrix segments, wherein the plurality of matrix segments are in one-to-one correspondence with the plurality of sub-segment pairs.

That is to say, in this embodiment, the correlation matrix is segmented into matrix segments, and then the target segment pairs are further segmented by the matrix segments, so as to obtain a plurality of segment pairs.

Exemplarily, continue to take the correlation matrix shown in FIG. 11 as an example, and assuming that the time window is 3 seconds, if the sequence position of the first identifier in the first place in the current remaining a correlation matrix is $P_i$, as long as the sequence positions of other sequences in the current remaining correlation matrix satisfy the relationship of $|P_i-P_j|\leq 3$, it will be segmented into a matrix segment.

Figure 12:
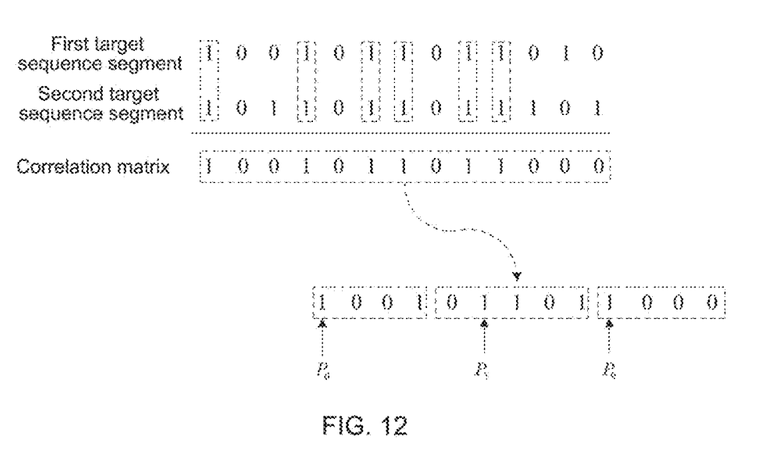
FIG. 12 is a schematic diagram of segmentation of matrix segment provided by an embodiment of the present disclosure.

As shown in FIG. 12, according to this segmentation principle, firstly, based on the position of $P_0$, the sequence values with an interval of no more than 3 seconds on the left and right sides are intercepted as a matrix segment. At this time, in the rest of the correlation matrix, the first identifier arranged in the first place is located at the position of $P_5$, and the sequence values with an interval of no more than 3 seconds on the left and right sides are intercepted as a matrix segment based on the position of $P_5$. At this time, in the remaining correlation matrix, the first identifier arranged in the first place is located at the position of $P_9$, and the sequence values with an interval of no more than 3 seconds on the left and right sides are intercepted as a matrix segment based on the position of $P_p$. Finally, the correlation matrix in FIG. 11 can be segmented into three matrix segments.

S104-2: taking the average slope of each sub-segment pair as the local correlation strength of each sub-segment pair.

Herein, each sub-segment pair includes a first subsequence segment intercepted in a first target sequence segment and a second subsequence segment intercepted in a second target sequence segment;

an expression for calculating the average slope of each sub-segment pair is:

$$AI_g = \frac{1}{m_g}\left(\frac{X_j - X_i}{Y_j - Y_i}\right), 1 \leq i \leq j \leq n,$$

where $AI_g$ represents the average slope of the gth sub-segment pair, n represents the sequence length of the gth sub-segment pair; $X_j, X_i$ represent the jth sequence value and the ith sequence value in the first subsequence segment respectively; $Y_j, Y_i$ represents the j sequence value and the i sequence value in the second subsequence segment respectively, and $m_g$ represents a total number of slopes.

In this expression, the sequence value in the first subsequence segment is taken as the coordinate on the vertical axis, and the sequence value in the second subsequence segment is taken as the coordinate on the horizontal axis, so that the slopes between them are calculated and averaged.

Exemplarily, with continued reference to FIG. 12, taking the first matrix segment in the figure as an example, its corresponding sub-segment pair includes a total of 6 slopes $k_0 \square k_5$.

$$k_0 = \frac{X_1 - X_0}{Y_1 - Y_0}, k_1 = \frac{X_2 - X_0}{Y_2 - Y_0}, k_2 = \frac{X_3 - X_0}{Y_3 - Y_0};$$

$$k_3 = \frac{X_2 - X_1}{Y_2 - Y_1}, k_4 = \frac{X_3 - X_1}{Y_3 - Y_1};$$

$$k_5 = \frac{X_3 - X_2}{Y_3 - Y_2}.$$

S104-3: taking the average of the local correlation strengths of a plurality of sub-segment pairs as the correlation strength between the first data sequence and the second data sequence.

Herein, the corresponding expression for the average value of the local correlation strengths of a plurality of sub-segment pairs is:

$$AI = \frac{1}{G}\sum_{g=1}^{G} AI_g,$$

where AI represents the correlation strength, G represents the number of local correlation strengths, and $AI_g$ represents the local correlation strength of the gth sub-segment pair.

S104-4: taking the average slope of the local correlation strengths of the plurality of sub-segment pairs as an acting force of the correlation strength.

Herein, the calculation expression of the average slope of the local correlation strengths of the plurality of sub-segment pairs is:

$$DI = \frac{1}{G}\left(\frac{AI_h - AI_g}{m_h - m_g}\right), 1 \leq h \leq g \leq G,$$

where DI represents the average slope of the local correlation strengths of the plurality of sub-segment pairs, G represents the number of the plurality of sub-segment pairs, $AI_h, AI_g$ represent the local correlation strength of the hth sub-segment and the local correlation strength of the gth sub-segment respectively, $m_h$ represents a sequence-number of the hth sub-segment, and $m_g$ represents a sequence-number of the gth sub-segment.

In this expression, the local correlation strengths of the plurality of sub-segment pairs are taken as the coordinates on the vertical axis, and the serial-numbers of the local correlation strengths of the plurality of sub-segment pairs are taken as the coordinates on the horizontal axis, so that the slopes between them are calculated and averaged.

Through the above implementation, after processing the two data sequences shown in FIGS. 1 and 2, it is found that the change between the two data sequences has a lag effect, wherein the correlation between the change characteristics of the two data sequences is strongest when the lag is 92 days. At this time, the linear correlation coefficient between the two is 0.75, which means that there is a significant linear correlation between the two, and the correlation index is 0.79 and the correlation strength is 0.86. When the lag duration is 92 days, the acting force of the change duration on the correlation strength is 0.0034.

To sum up, in the above implementations, sequence segments of different time periods are intercepted from the first data sequence and the second data sequence to form segment pairs, and the target segment pair with the largest correlation index is selected therefrom as the analysis object based on the correlation index of each segment pair, so as to obtain the relationship between the first data sequence and the second data sequence. In this way, the lagging correlation relationship between the two data sequences can be obtained.

Figure 13:
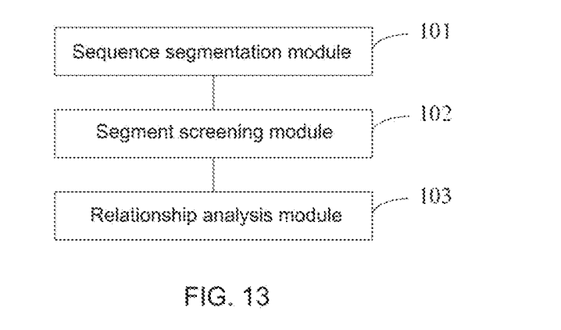
FIG. 13 is a structural schematic diagram of an apparatus for analyzing a relationship between data sequences provided by an embodiment of the present disclosure.

Based on the same inventive concept as the method for analyzing a relationship between data sequences provided in the embodiments, this embodiment further provides an apparatus for analyzing a relationship between data sequences, which includes at least one software functional module that can be stored in a memory 201 or solidified in an operating system (OS) of an electronic device in the form of software. The processor 202 in the electronic device is configured for executing executable modules stored in the memory 201, such as software functional modules and computer program, etc. included in the apparatus for analyzing a relationship between data sequences. Referring to FIG. 13, functionally, the apparatus for analyzing a relationship between data sequences may include a sequence segmentation module 101, a segment screening module 102, and a relationship analysis module 103.

The sequence segmentation module 101 is configured for acquiring a first data sequence and a second data sequence.

The sequence segmentation module 101 is further configured for obtaining correlation indexes of a plurality of segment pairs according to the first data sequence and the second data sequence, wherein each segment pair includes a first sequence segment of the first data sequence and a second sequence segment of the second data sequence, and the first sequence segment and the second sequence segment are respectively intercepted from different time periods.

In this embodiment, the sequence analysis module is configured for implementing steps S101 and S102 in FIG. 4. For a detailed introduction of the sequence analysis module, please refer to the description of steps S101 and S102.

The segment screening module 102 is configured for selecting, according to the correlation indexes of the plurality of segment pairs, a target segment pair with the largest correlation index therefrom.

In this embodiment, the segment screening module 102 is configured for implementing step S103 in FIG. 4. For a detailed description of the segment screening module 102, please refer to the detailed description of step S103.

The relationship analysis module 103 is configured for obtaining correlation information between the first data sequence and the second data sequence according to the target segment pair.

In this embodiment, the relationship analysis module 103 is configured for implementing step S104 in FIG. 4. For a detailed description of the relationship analysis module 103, please refer to the detailed description of step S104.

It is worth noting that, because the apparatus has the same inventive concept as the method for analyzing a relationship between data sequences, the above sequence segmentation module 101, segment screening module 102 and relationship analysis module 103 may also be configured for implementing other steps or sub-steps of the method for analyzing a relationship between data sequences, which is not specifically limited in this embodiment.

In addition, each functional module in each embodiment of the present disclosure may be integrated to form an independent part, or each module may exist alone, or two or more modules may be integrated to form an independent part.

It should also be understood that the above implementations may be stored in a computer-readable storage medium if they are implemented in the form of software functional modules and sold or used as independent products. Based on this understanding, the essential part of the technical solutions of the present disclosure or the part of the technical solutions that contributes to the prior art may be embodied in the form of a software product, which is stored in a storage medium and includes a number of instructions to make a computer device (which may be a personal computer, a server, or a network device, etc.) perform all or some of the steps of the methods described in various embodiments of the present disclosure.

Therefore, an embodiment further provides a computer-readable storage medium, which stores a computer program, and the computer program, when executed by a processor, implements the method for analyzing a relationship between data sequences provided in the embodiments of the present disclosure. Herein, the computer-readable storage media may be: U disk, mobile hard disk, read-only memory (ROM), random access memory (RAM), magnetic disk or optical disk, and other media that can store program codes.

Figure 14:
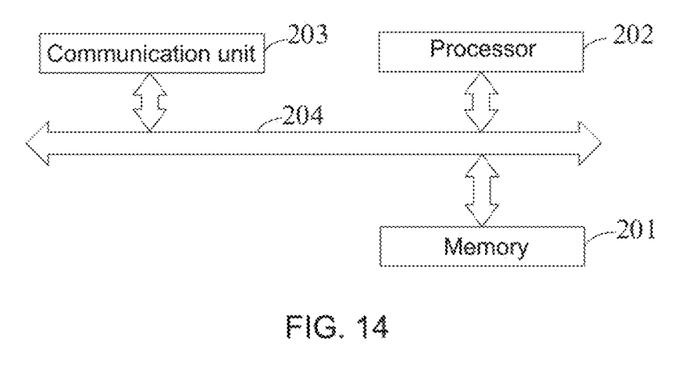
FIG. 14 is a structural schematic diagram of an electronic device provided by an embodiment of the present disclosure.

Please refer to FIG. 14, an embodiment further provides an electronic device, which includes a processor 202 and a memory 201. Further, the memory 201 stores a computer program, and the processor implements the method for analyzing a relationship between data sequences provided in this embodiment by reading and executing the computer program in the memory 201 corresponding to the above implementation.

With continued reference to FIG. 14, the electronic device further includes a communication unit 203. The elements of the memory 201, the processor 202 and the communication unit 203 are directly or indirectly electrically connected to each other through the system bus 204, so as to implement data transmission or interaction.

Herein, the memory 201 may be an information recording apparatus based on any electronic, magnetic, optical principle or other physical principles, which is configured for recording execution instructions, data, etc. In some implementations, the memory 201 may be, but is not limited to, a volatile memory, a nonvolatile memory, a storage drive, etc.

In some implementations, the volatile memory may be a random access memory (RAM). In some implementations, the nonvolatile memory may be a read only memory (ROM), a programmable read-only memory (PROM), an erasable programmable read-only memory (EPROM), an electrically erasable programmable read-only memory (EEPROM), flash memory, etc. In some implementations, the storage drive may be a magnetic disk drive, a solid state hard disk, any type of storage disk (such as optical disk, DVD, etc.), or a similar storage medium, or a combination thereof, etc.

The communication unit 203 is configured for sending and receiving data through network. In some implementations, the network may include wired network, wireless network, optical fiber network, telecommunications network, intranet, Internet, local area network (LAN), wide area network (WAN), wireless local area network (WLAN), metropolitan area network (MAN), public switched telephone network (PSTN), Bluetooth network, ZigBee network, near field communication (NFC) network, etc., or any combination thereof. In some embodiments, the network may include one or more network access points. For example, the network may include a wired or wireless network access point, such as a base station and/or a network switching node, through which one or more components of the service request processing system may be connected to the network to exchange data and/or information.

The processor 202 may be an integrated circuit chip with signal processing capabilities, and the processor may include one or more processing cores (for example, a single-core processor or a multi-core processor). For example only, the processor may include a central processing unit (CPU), an application specific integrated circuit (ASIC), an application specific instruction-set processor (ASIP), a graphics processing unit (GPU), a physical processing unit (PPU), a digital signal processor (DSP), a field programmable gate array (FPGA), a programmable logic device (PLD), a controller, a microcontroller unit, a reduced instruction set computing (RISC), a microprocessor, etc., or any combination thereof.

It should be understood that the apparatus and method disclosed in the above implementations may also be implemented in other ways. The apparatus embodiments described above are only schematic. For example, the flowcharts and block diagrams in the accompanying drawings show the architecture, functions and operations of possible implementations of the apparatus, method and computer program product according to various embodiments of the present disclosure. In this regard, each block in the flowchart or block diagram may represent a module, a program segment or a part of codes, the module, the program segment or the part of codes contains one or more executable instructions for implementing specified logical functions. It should also be noted that in some alternative implementations, the functions noted in the blocks may occur in a different order than those noted in the accompanying drawings. For example, two consecutive blocks may actually be executed substantially in parallel, and may sometimes be executed in the reverse order, depending on the functions involved. It should also be noted that each block in the block diagrams and/or flowcharts, and combinations of blocks in the block diagrams and/or flowcharts may be implemented by a dedicated hardware-based system that performs specified functions or actions, or may be implemented by a combination of dedicated hardware and computer instructions.

The above are only various implementations of the present disclosure, but the scope of protection of the present disclosure is not limited to this. Any changes or substitutions that can be easily conceived by the person familiar with this technical field within the technical scope disclosed in the present disclosure should fall within the scope of protection of the present disclosure. Therefore, the scope of protection of the present disclosure shall be subject to the scope of protection of the claims.

What is claimed is:

1. A method for analyzing a relationship between data sequences, comprising steps of:
    acquiring a first data sequence and a second data sequence;
    binarizing the first data sequence into a first equivalent sequence according to a first sequence threshold of the first data sequence;
    binarizing the second data sequence into a second equivalent sequence according to a second sequence threshold of the second data sequence;
    incrementing a current lag duration to obtain a target lag duration;
    intercepting a first equivalent segment from the first equivalent sequence according to the target lag duration;
    intercepting a second equivalent segment from the second equivalent sequence according to the target lag duration, wherein a time period corresponding to the first equivalent segment is staggered from a time period corresponding to the second equivalent segment by the target lag duration;
    obtaining a correlation index of a current segment pair according to the first equivalent segment and the second equivalent segment, wherein the current segment pair comprises the first sequence segment in the first data sequence corresponding to the first equivalent segment and the second sequence segment in the second data sequence corresponding to the second equivalent segment,
    wherein if the target lag duration does not meet a termination condition, it is returned to perform the step of incrementing a current lag duration to obtain a target lag duration, until the target lag duration meets the termination condition, so as to obtain the correlation indexes of the plurality of segment pairs;
    selecting, according to the correlation indexes of the plurality of segment pairs, a target segment pair with the largest correlation index therefrom; and
    obtaining correlation information between the first data sequence and the second data sequence according to the target segment pair.

2. The method for analyzing a relationship between data sequences according to claim 1, wherein for each sequence value in the first data sequence, if the sequence value is greater than the first sequence threshold, it is set as a first sequence value; and
    if the sequence value is less than or equal to the first sequence threshold, it is set as a second sequence value; and
    for each sequence value in the second data sequence, if the sequence value is greater than the second sequence threshold, it is set as the first sequence value; and
    if the sequence value is less than or equal to the second sequence threshold, it is set as the second sequence value.

3. The method for analyzing a relationship between data sequences according to claim 2, wherein an expression for obtaining a correlation index of a current segment pair according to the first equivalent segment and the second equivalent segment is:

$$CI = \frac{N_{XY}}{N_{XX} + N_{YY} - N_{XY}},$$

where CI represents the correlation index of the current segment pair, $N_{XY}$ represents number of correlation index pairs between the first equivalent segment and the second equivalent segment, wherein the first sequence values located at same sequence positions of the first equivalent segment and the second equivalent segment constitute a correlation index pair, $N_{XX}$ represents a sequence length of the first equivalent segment, and $N_{YY}$ represents a sequence length of the second equivalent segment.

4. The method for analyzing a relationship between data sequences according to claim 1, wherein the step of obtaining correlation information between the first data sequence and the second data sequence according to the target segment pair comprises:

segmenting the target segment pair into a plurality of sub-segment pairs;
taking an average slope of each sub-segment pair as a local correlation strength of each sub-segment pair respectively;
taking an average value between the local correlation strengths of the plurality of sub-segment pairs as a correlation strength between the first data sequence and the second data sequence; and
taking the average slope of the local correlation strengths of the plurality of sub-segment pairs as an acting force of the correlation strength.

5. The method for analyzing a relationship between data sequences according to claim 4, wherein the target segment pair comprises a first target sequence segment and a second target sequence segment, and the step of segmenting the target segment pair into a plurality of sub-segment pairs comprises:

binarizing the first target sequence segment into a first target equivalent segment according to the first sequence threshold of the first data sequence, wherein for each sequence value in the first target sequence segment, if the sequence value is greater than the first sequence threshold, it is set as the first sequence value; and if the sequence value is less than or equal to the first sequence threshold, it is set as the second sequence value;
binarizing the second target sequence segment into a second target equivalent segment according to the second sequence threshold of the second data sequence, wherein for each sequence value in the second target sequence segment, if the sequence value is greater than the second sequence threshold, it is set as the first sequence value; and
if the sequence value is less than or equal to the second sequence threshold, it is set as the second sequence value;
comparing the same sequence positions of the first target equivalent segment and the second target equivalent segment, so as to obtain a correlation matrix between the first target equivalent segment and the second target equivalent segment, wherein for the same sequence positions of the first target equivalent segment and the second target equivalent segment, if the sequence values are all the first sequence values, the sequence positions are set as a first identifier; and if the sequence values comprise the second sequence, the sequence positions are set as a second identifier;
determining the first identifier arranged in a first place from a current remaining correlation matrix;
intercepting a matrix segment in a preset time window from the current remaining correlation matrix, based on the sequence positions of the first identifier, wherein if the current remaining correlation matrix comprises the first identifier, it is returned to perform the step of determining the first identifier arranged in a first place from a current remaining correlation matrix, until the current remaining correlation matrix no longer comprises the first identifier, so as to obtain a plurality of matrix segments; and
intercepting the plurality of sub-segment pairs from the target segment pair according to the plurality of matrix segments, wherein the plurality of matrix segments are in one-to-one correspondence with the plurality of sub-segment pairs.

6. The method for analyzing a relationship between data sequences according to claim 4, wherein the target segment pair comprises a first target sequence segment and a second target sequence segment;

each subsequence pair comprises a first subsequence segment intercepted from the first target sequence segment and a second subsequence segment intercepted from the second target sequence segment;
an expression for calculating the average slope of each sub-segment pair is:

$$AI_g = \frac{1}{m_g}\left(\frac{X_j - X_i}{Y_j - Y_i}\right), 1 \le i \le j \le n,$$

where $AI_g$ represents the average slope of the gth sub-segment pair, n represents the sequence AI length of the gth sub-segment pair; $X_j$, $X_i$ represent the jth sequence value and the ith sequence value in the first subsequence segment respectively; $Y_j$, $Y_i$ represents the j sequence value and the i sequence value in the second subsequence segment respectively, and $m_g$ represents a total number of slopes;

an expression for calculating the average slope of the local correlation strengths of the plurality of sub-segment pairs is:

$$DI = \frac{1}{G}\left(\frac{AI_h - AI_g}{m_h - m_g}\right), 1 \le h \le g \le G,$$

where DI represents the average slope of the local correlation strengths of the plurality of sub-segment pairs, G represents a number of the plurality of sub-segment pairs, $AI_h$, $AI_g$ represent the local correlation strength of the hth sub-segment and the local correlation strength of the gth sub-segment respectively, $m_h$ represents a sequence-number of the hth sub-segment, and $m_g$ represents a sequence-number of the gth sub-segment.

7. A storage medium, storing a computer program, wherein the computer program, when executed by a processor, implements the method for analyzing a relationship between data sequences according to claim 1.

8. An electronic device, comprising a processor and a memory, wherein the memory stores a computer program, and the computer program, when executed by the processor, implements the method for analyzing a relationship between data sequences according to claim 1.

9. An apparatus for analyzing a relationship between data sequences, comprising:

a sequence segmentation module, configured for acquiring a first data sequence and a second data sequence,
wherein the sequence segmentation module is further configured for binarizing the first data sequence into a first equivalent sequence according to a first sequence threshold of the first data sequence;
binarizing the second data sequence into a second equivalent sequence according to a second sequence threshold of the second data sequence;
incrementing a current lag duration to obtain a target lag duration;
intercepting a first equivalent segment from the first equivalent sequence according to the target lag duration;
intercepting a second equivalent segment from the second equivalent sequence according to the target lag duration, wherein a time period corresponding to the first equivalent segment is staggered from a time period corresponding to the second equivalent segment by the target lag duration;
obtaining a correlation index of a current segment pair according to the first equivalent segment and the second equivalent segment, wherein the current segment pair comprises the first sequence segment in the first data sequence corresponding to the first equivalent segment and the second sequence segment in the second data sequence corresponding to the second equivalent segment,
wherein if the target lag duration does not meet a termination condition, it is returned to perform the step of incrementing a current lag duration to obtain a target lag duration, until the target lag duration meets the termination condition, so as to obtain the correlation indexes of the plurality of segment pairs;
a segment screening module, configured for selecting, according to the correlation indexes of the plurality of segment pairs, a target segment pair with a largest correlation index therefrom; and
a relationship analysis module, configured for obtaining correlation information between the first data sequence and the second data sequence according to the target segment pair.

* * * * *